Patented Aug. 27, 1940

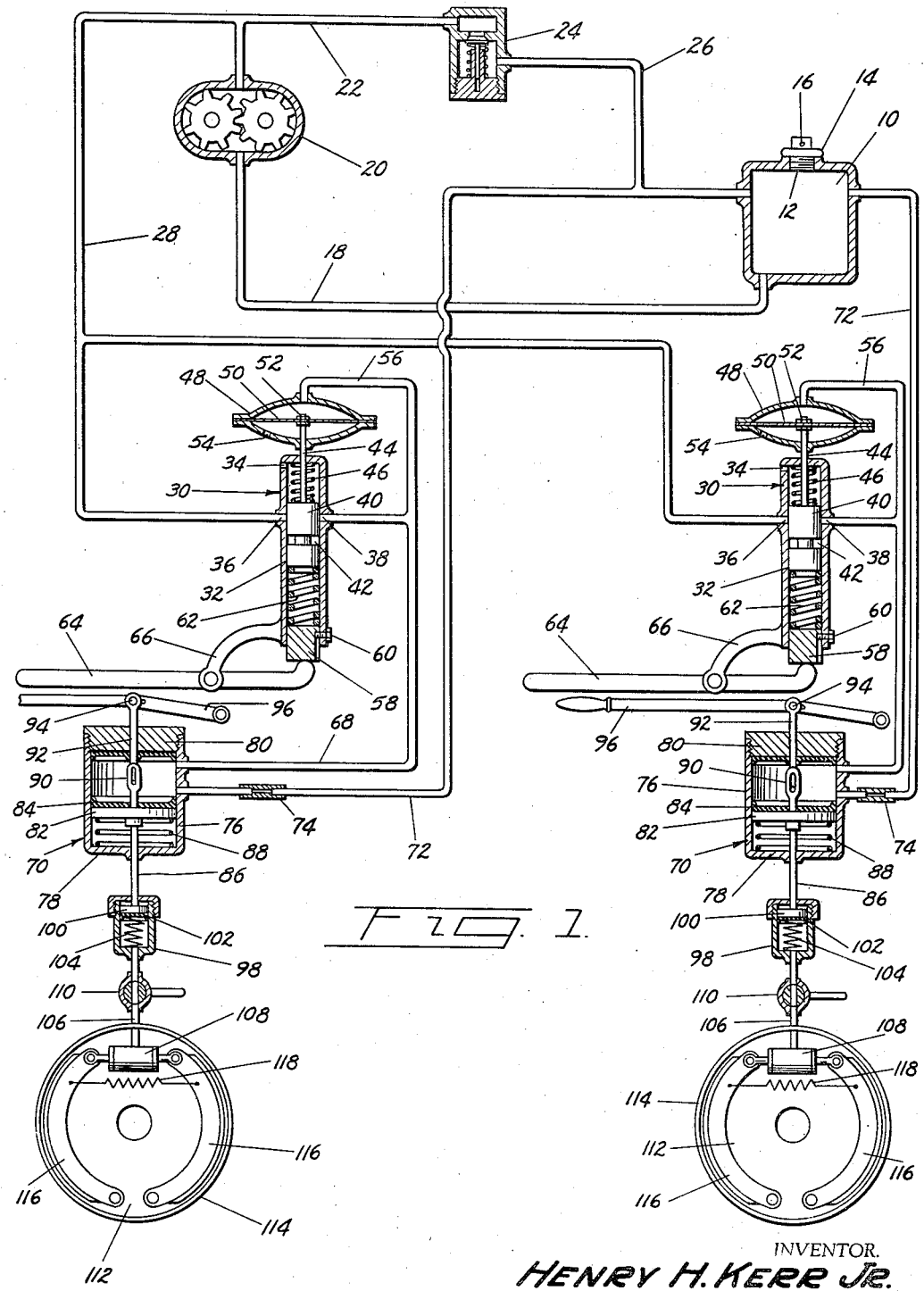

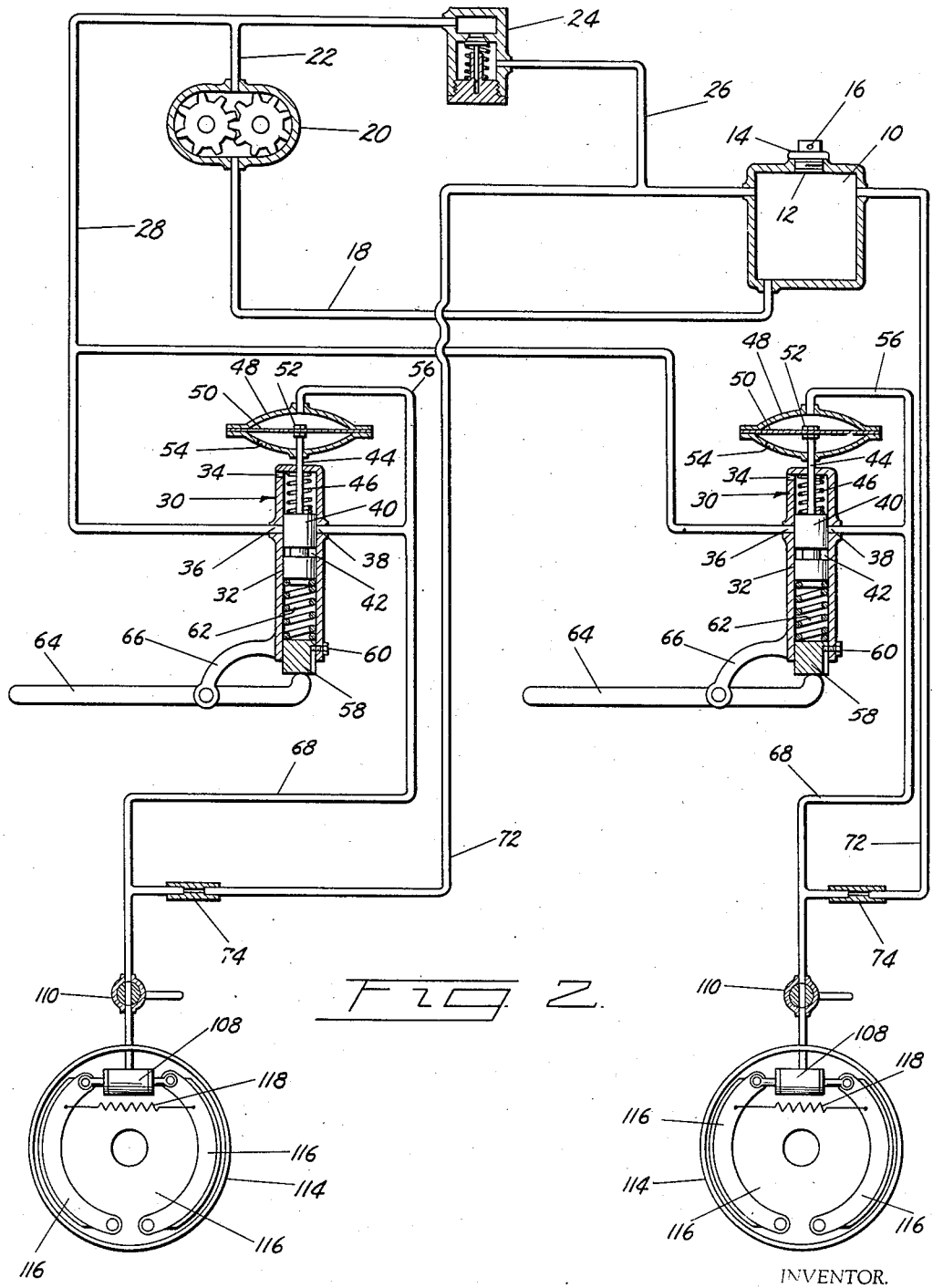

2,212,920

UNITED STATES PATENT OFFICE 2,212,920

AIRPLANE BRAKE

Henry H. Kerr, Jr., South Bend, Ind., assignor to Bendix Products Corporation, South Bend, Ind., a corporation of Indiana Application November 11, 1936, Serial No. 110,206

5 Claims. (Cl. 303—6)

This invention relates to fluid pressure braking systems, and more particularly to fluid pressure braking systems for airplanes.

Broadly the invention comprehends a fluid pressure braking system including means for circulating a rather large volume of fluid under a predetermined pressure, and means for controlling the movement of the fluid under pressure so that braking elements connected to the system may be effectively actuated.

An object of the invention is to provide a fluid pressure braking system having means for varying the pressure on the fluid in the actuators for the braking elements.

Another object of the invention is to provide a fluid pressure braking system having means for maintaining a volume of fluid under a predetermined pressure ample for the actuation of the braking elements connected to the system and to so control the movement of the fluid under pressure that the force with which the braking elements are applied may be varied at will of the operator and that the operator may have the feel of the power within his control.

Another object of the invention is to provide a fluid pressure braking system in which provision is made for the elimination of obnoxious pulsations of the fluid in the system and any vibrations that may be incidental to such pulsations.

Another object of the invention is to provide a fluid pressure braking system in which a volume of fluid is maintained at a constant predetermined pressure which may be metered at will of the operator to fluid pressure actuated motors arranged for the actuation of braking elements, and to equip the system with auxiliary means for actuating the braking elements for use in the event of failure of the system.

Other objects and advantages of the invention will appear from the following description taken in connection with the drawings forming a part of this specification, and in which,—

Fig. 1 is a diagrammatical view illustrating a fluid pressure braking system embodying the invention; and Fig. 2 is a diagrammatical view illustrating a modification of the invention.

Referring to the drawings for more specific details of the invention, 10 represents a reservoir of any conventional type having a filling opening 12 which may be closed as by a plug 14 provided with a suitable opening 16 for venting the reservoir to the atmosphere. A supply pipe or conduit 18 connects the reservoir to the intake port of a pump 20 of any preferred type, and the discharge port of this pump is connected by a fluid pressure delivery pipe or conduit 22 to a fluid pressure relief valve 24 connected by a return pipe 26 to the reservoir.

A fluid pressure delivery pipe or conduit 28 connected to the pipe or conduit 22 between the pump 20 and the relief valve 24 has branches connected respectively to corresponding valve mechanisms indicated generally at 30. These valve mechanisms are preferably arranged for convenient operation, one by the right hand and the other by the left hand of an operator or pilot.

Each of the valves includes a cylindrical valve chamber 32 open at one end and closed at its other end. The chamber is provided with an opening 34 adjacent the closed end for venting the chamber to the atmosphere. The chamber has an intake port 36 to which the fluid pressure delivery pipe 28 is connected, and a discharge port 38 arranged diametrically opposite the intake port. A piston valve 40 reciprocable in the chamber has a circumferential groove 42 adapted to register with the intake and exhaust ports so as to provide for the free passage of fluid through the valve chamber. The valve has a stem 44 extending through the closed end of the valve chamber, and a spring 46 is sleeved on the stem between the valve and the closed end of the chamber.

A housing 48 has therein a diaphragm 50 connected to the stem 44 of the valve as at 52 so as to balance the valve between the spring 46 and the diaphragm 50. As shown, the diaphragm divides the housing 48 into two chambers, one vented to the atmosphere as indicated at 54, and the other connected by a pipe line or conduit 56 to the discharge port 38 of the valve chamber 32. The load on the spring 46 may be varied as by a thrust block 58 slidable in the valve chamber and held against displacement by a set screw 60. As shown, a spring 62 interposed between the thrust block 58 and the valve 40 provides a cushion for the valve and also serves to transmit force from the thrust block to the valve, and an actuating lever 64 pivoted on a bracket 66 on the wall of the valve chamber is operative to actuate the thrust block so as to open the valve.

A fluid delivery pipe 68 connected to the pipe line or conduit 56 between the discharge port 38 of the valve chamber 32 and the housing for the diaphragm has connected thereto a fluid pressure actuated motor 70, and a return pipe 72 connecting the motor to the reservoir 10 has coupled therein a restriction 74.

The motor 70 includes a cylinder 76 having one end closed as at 78 and its other end provided with a removable head 80. A piston 82 reciprocable in the cylinder has on its head a leak-proof cup 84 for inhibiting the seepage of fluid past the piston. The piston has a rod 86 extending through the piston and suitably secured thereto. One end of this rod extends through the closed end of the cylinder, and a return spring 88 is sleeved over the rod between the back of the piston and the closed end of the cylinder. The other end of the rod 86 is attached by an overrunning connection to one end of a rod 92 reciprocable in the removable head 80, and the other end of this rod 92 is connected as at 94 to an auxiliary operating lever 96 pivoted on a fixed support adjacent the operating lever 64.

Arranged concentrically to the fluid pressure actuated motor 78 is a relatively small fluid pressure actuated motor 98 having therein a piston 100 suitably connected to the piston rod 86 of the motor 70. A leaf-proof cup 102 on the head of the piston 100 is held against displacement by a light spring 104 interposed between the cup and the head of the motor.

The motor 98 is connected by a fluid pressure delivery pipe or conduit 106 to a fluid pressure actuated motor 108 arranged for the actuation of a brake structure, and a cut-off valve 110 is coupled in the fluid pressure delivery pipe 106 so that retrograde movement of the fluid in the motor 108 may be inhibited so as to retain the brake in applied position.

The brake may be of any conventional type including a fixed support or backing plate 112, a rotatable drum 114 associated therewith, a pair of corresponding interchangeable shoes 116 mounted on the backing plate for cooperation with the braking surface of the drum, and a motor corresponding to the motor 108 arranged on the backing plate between the shoes and operative to spread the shoes into engagement with the drum against the resistance of the retractile spring 118 connected between the shoes.

A modification of the invention is illustrated in Fig. 2. In this modification the auxiliary operating means including the motors 70 and 98 is eliminated and the fluid pressure delivery pipe or conduit 68 is connected through the cut-off valve 110 to the motor 108 for actuating the brake, and the return pipe 72 is connected to the delivery pipe 68 between the valve 110 and the discharge port 38 of the valve 30.

Normally a rather large volume of fluid circulates from the reservoir 10 through the supply pipe or conduit 18, the relief valve 24, and the return pipe 26, back to the reservoir. The valve 24 serves to maintain a predetermined pressure in the delivery pipe or conduit 22, and since this conduit is connected by the delivery pipe or conduit 28 and its respective branches to the valves 40, a corresponding pressure on the fluid is maintained up to the valves, which are normally held in closed position and are balanced between the springs 46 and the diaphragms 50.

Under this condition, in a normal braking application, the operator or pilot actuates the operating levers 64. Upon movement of these levers, force is transmitted therefrom to the thrust blocks 58, resulting in movement of the thrust blocks against the resistance of the cushioning springs 62. The load imposed on the cushioning springs 62 by this movement of the thrust blocks is sufficiently in excess of the loads on the diaphragms 50 to cause ample movement of the piston valves 40 to establish communication with the delivery pipe or conduit 28.

Upon establishing this communication, fluid under pressure passes through the valves 40 and is delivered from the valves through the pipe lines or conduits 58 to the housing 48 where the pressure on the fluid is received by the diaphragms 50. This has a tendency to close the valves against the resistance of the force applied by the operator, hence the operator has the feel of the pressure or force within his control.

Simultaneously with this operation fluid under pressure is being delivered through the fluid pressure delivery pipes or conduits 68 communicating with the pipe lines or conduits 56 to the fluid pressure actuated motors 70, resulting in actuation of these motors. It is, of course, clearly understood that the extent of actuation of these motors 70 may be varied at the will of the operator and that the valves 40 are the instrumentalities by which this is accomplished.

The valves 40 may be readily manipulated by the operator to meter the fluid through the valves as desired. It will also be apparent that this condition may result in pulsations of the fluid accompanied by objectionable vibrations, and in order to overcome this difficulty the return pipes 72 connecting the cylinders of the motors 70 to the reservoir 10 are provided with restrictions 74 which effectively meter the fluid so as to eliminate pulsations and vibrations in the system and to smooth out the operation of the motors 70.

The pistons 82 of the motors 70 are so connected to the pistons 100 of the motors 98 that the pistons 82 and 100 move together. Accordingly, upon actuation of the motors 70 the motors 98 are correspondingly actuated. The motors 98 are connected by fluid pressure delivery pipes 106 to fluid pressure actuated motors 108, and cut-off valves 110 are coupled in the delivery pipes 106. Thus, upon actuation of the motors 98, the motors 108 are correspondingly actuated, and actuation of the motors 108 results in movement of the shoes 116 into engagement with the braking surface of the drum 114 against the resistance of the retractile spring 118 to effectively apply the brakes.

The force with which the respective brakes are applied is dependent entirely upon the extent of actuation of the motors 70 under control of the valves 40, and these valves may be manipulated by the operator to produce the effect desired. This is particularly desirable, if not essential, in braking systems for aeroplanes, particularly in taxiing and in manipulating the plane to a definite position. After the brakes have been applied, the valves 110 may be closed to prevent retrograde movement of the fluid in the motors 108 so as to retain the brakes in applied position, as in parking.

In the event of failure of the braking system, due to leakage or breakage and the resultant loss of fluid or a substantial loss in the pressure on the fluid, the brakes may still be effectively actuated by the auxiliary operating means. This auxiliary operating means includes the manually operative levers 96 connected to the piston rods 92 of the motors 70 through overrunning connections 90 normally providing for undisturbed movement of the pistons due to the introduction of fluid under pressure into the cylinders 78 of the motors 70 and yet providing means for actuating the pistons 82 so that force may be transmitted therefrom to the pistons of the motors 98 to cause actuation of the motors 98 and a displacement of fluid therefrom to the motors 108 resulting in actuation of the latter accompanied by actuation of the brakes.

In the modification of the invention the mode of operation is substantially the same as that of the preferred form of the invention, and need not be repeated here, since the only difference is that the auxiliary operating means for applying the brakes has been deleted.

Although this invention has been described in connection with certain specific embodiments, the principles involved are susceptible of numerous other applications that will readily occur to persons skilled in the art. The invention is, therefore, to be limited only as indicated by the scope of the appended claims:

Having thus described the various features of the invention, what I claim as new and desire to secure by Letters Patent is,

1. A fluid pressure braking system comprising brakes, means for circulating fluid under pressure, fluid pressure actuated means operated by said fluid and operating said brakes, valve means for controlling the delivery of fluid pressure to said actuated means, a manually operated means for controlling said valve, an auxiliary fluid pressure transmitting system for transmitting pressure from said actuated means to said brakes, and means for operating separately said auxiliary system.

2. A fluid pressure braking system comprising brakes, means for circulating fluid under pressure, fluid pressure actuated means operated by said fluid and operating said brakes, valve means for controlling the delivery of fluid pressure to said actuated means, a manually operated means for controlling said valve, an auxiliary fluid pressure transmitting system for transmitting pressure from said actuated means to said brakes, and a restriction for preventing excessive variations in pressure in said actuated means.

3. A fluid pressure braking system comprising brakes, means for circulating fluid under pressure, fluid pressure actuated means operated by said fluid and operating said brakes, valve means for controlling the delivery of fluid pressure to said actuated means, a manually operated means for controlling said valve, an auxiliary fluid pressure transmitting system for transmitting pressure from said actuated means to said brakes, said auxiliary system including a shut-off valve for holding the brake applied, and means for operating separately said auxiliary system.

4. A fluid pressure braking system comprising brakes, means for circulating fluid under pressure, fluid pressure actuated means operated by said fluid and operating said brakes, valve means for controlling the delivery of fluid pressure to said actuated means, a manually operated means for controlling said valve, an auxiliary fluid pressure transmitting system for transmitting pressure from said actuated means to said brakes, said auxiliary system including a piston in the actuated means, a piston in the auxiliary system and a rod connecting said pistons.

5. A fluid pressure braking system comprising brakes, means for circulating fluid under pressure, fluid pressure actuated means operated by said fluid and operating said brakes, valve means for controlling the delivery of fluid pressure to said actuated means, a manually operated means for controlling said valve, means for directly applying pressure to said actuated means, and auxiliary fluid pressure means operable to apply brakes in case of leakage or failure of pressure in any other part of the braking system.

HENRY H. KERR, Jr.